(12) United States Patent
Kawamori et al.

(10) Patent No.: US 11,273,500 B2
(45) Date of Patent: Mar. 15, 2022

(54) DRILLING METHOD AND DRILLING MACHINE

(71) Applicant: SUGINO MACHINE LIMITED, Uozu (JP)

(72) Inventors: Yoshiteru Kawamori, Uozu (JP); Kazuo Kimura, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 66 days.

(21) Appl. No.: 16/822,462

(22) Filed: Mar. 18, 2020

(65) Prior Publication Data
US 2020/0306838 A1 Oct. 1, 2020

(30) Foreign Application Priority Data
Mar. 25, 2019 (JP) .............................. JP2019-057121

(51) Int. Cl.
  *B23B 39/16* (2006.01)
  *B23B 35/00* (2006.01)
  *B23B 39/24* (2006.01)

(52) U.S. Cl.
  CPC ............ *B23B 39/161* (2013.01); *B23B 35/00* (2013.01); *B23B 39/24* (2013.01)

(58) Field of Classification Search
  CPC ........ B23B 35/00; B23B 39/161; B23B 39/24
  See application file for complete search history.

(56) References Cited

U.S. PATENT DOCUMENTS

| | | | | |
|---|---|---|---|---|
| 2,955,489 A | * | 10/1960 | Hess ....................... | B23B 39/24 408/3 |
| 3,822,958 A | * | 7/1974 | Lewis .................... | B23Q 1/621 408/46 |
| 7,637,702 B2 | * | 12/2009 | Furukawa ............... | B23B 35/00 408/1 R |

FOREIGN PATENT DOCUMENTS

| | | |
|---|---|---|
| CN | 107649913 A | 2/2018 |
| CN | 108161062 A | 6/2018 |
| EP | 3406376 A1 | 11/2018 |

(Continued)

OTHER PUBLICATIONS

Office Action dated Feb. 12, 2020 in a corresponding Japanese patent application No. 2019-057121 (5 pages).

(Continued)

*Primary Examiner* — Eric A. Gates
(74) *Attorney, Agent, or Firm* — United IP Counselors, LLC

(57) ABSTRACT

A drilling method of machining holes that are not regularly arranged in one direction in a short machining time is provided.
A drilling method, includes: creating a machining order of machining a first hole to be machined with a first spindle and a second hole to be machined with a second spindle for a workpiece having a plurality of target holes on a machining table, the first spindle and the second spindle arranged in X direction; rotating the machining table relative to the first spindle and the second spindle so that the first hole and the second hole are arranged in X direction with the first hole located nearer to the first spindle; moving the first spindle and the second spindle relative to the machining table so that the first hole and a center of the first spindle are aligned and the second hole and a center of the second spindle are (Continued)

aligned; and machining the first hole with the first spindle and the second hole with the second spindle.

12 Claims, 13 Drawing Sheets

(56)  References Cited

FOREIGN PATENT DOCUMENTS

| | | |
|---|---|---|
| JP | S53-018941 Y2 | 5/1978 |
| JP | H02-088109 A | 3/1990 |
| JP | H05-111813 A | 5/1993 |
| JP | H06-155121 A | 6/1994 |
| JP | 2000-071205 A | 3/2000 |
| JP | 2003-188491 A | 7/2003 |
| JP | 2005-215720 A | 8/2005 |
| JP | 2007-030061 A | 2/2007 |

OTHER PUBLICATIONS

Extended European Search Report dated Aug. 18, 2020 in a corresponding European patent application No. 20164054.7 (8 pages).

* cited by examiner

FIG. 7

| MACHINING ORDER | 1 | | 2 | | 3 | | 4 | | 5 | | 6 | | 7 | | 8 | | 9 | |
|---|---|---|---|---|---|---|---|---|---|---|---|---|---|---|---|---|---|---|
| SPINDLE NUMBER | 1 | 2 | 1 | 2 | 1 | 2 | 1 | 2 | 1 | 2 | 1 | 2 | 1 | 2 | 1 | 2 | 1 | 2 |
| INDIVIDUAL | ( 15 | 10 | 4 | 5 | 17 | 7 | 12 | 11 | 16 | 14 | 3 | 18 | 9 | 8 | 13 | 1 | 6 | 2 ) |

FIG. 9

PARENT 1  (13  6  17  12 | 8  3  16  7  10  4  15  18 | 11  5  14  1  9  2 )

PARENT 2  (12  5  10  8 | 18  16  14  17  9  7  3  1 | 2  13  15  4  6  11 )

CHILD 1   (13  6  4  12 | 18  16  14  17  9  7  3  1 | 11  5  15  8  10  2 )

CHILD 2   (12  5  9  1 | 8  3  16  7  10  4  15  18 | 2  13  14  17  6  11 )

FIG. 13

| MACHINING ORDER | 1 | | 2 | | 3 | | 4 | | 5 | | 6 | | 7 | | 8 | | 9 | | 10 |
|---|---|---|---|---|---|---|---|---|---|---|---|---|---|---|---|---|---|---|---|
| SPINDLE NUMBER | 1 | 2 | 1 | 2 | 1 | 2 | 1 | 2 | 1 | 2 | 1 | 2 | 1 | 2 | 1 | 2 | 1 | 2 | - |
| INDIVIDUAL | ( 14 | 11 | 5 | 4 | 16 | 12 | 8 | 19 | 9 | 7 | 2 | 17 | 10 | 15 | 18 | 3 | 13 | 1 | 6 ) |

DRILLING METHOD AND DRILLING MACHINE

CROSS-REFERENCE TO RELATED APPLICATIONS

This application claims the benefit of priority to Japanese Patent Application No. 2019-057121, filed on Mar. 25, 2019, the entire contents of which are hereby incorporated by reference.

BACKGROUND

1. Technical Field

The present invention relates to a drilling method and a drilling machine.

2. Description of the Background

As a machining tool capable of drilling a plurality of target holes, a machining center and a multi-axis drilling machine are known (e.g., Japanese Patent Application Publication No. H05-111813, hereinafter, Patent Literature 1).

BRIEF SUMMARY

When a machining center drills holes, the machining center drills one hole at a time. Even in the case of using the drilling machine such as disclosed in Patent Literature 1, holes not arranged at the same pitch are processed one by one.

The present invention provides a drilling method and a drilling machine of machining holes that are not regularly arranged in one direction in a short machining time.

A first aspect of the present invention provides a drilling method, including:

creating a machining order of machining a first hole to be machined with a first spindle and a second hole to be machined with a second spindle for a workpiece having a plurality of target holes, the workpiece arranged on a machining table, the first spindle and the second spindle arranged in X direction;

rotating the machining table relative to the first spindle and the second spindle so that the first hole and the second hole are arranged in X direction with the first hole located nearer to the first spindle;

moving the first spindle and the second spindle relative to the machining table so that the first hole and a center of the first spindle are aligned and the second hole and a center of the second spindle are aligned; and machining the first hole with the first spindle and the second hole with the second spindle.

A second aspect of the present invention provides a drilling machine, including:

an X linear guide extending in X direction;

a first spindle configured to move in Z direction, the first spindle configured to move in X direction along the X linear guide;

a second spindle configured to move in Z direction, the second spindle configured to move in X direction along the X linear guide;

a Y linear guide extending in Y direction;

a machining table configured to move in Y direction along the Y linear guide, the machining table configured to rotate about a center of a rotation center extending in Z direction;

a control device including a storage device configured to store hole coordinates of a plurality of target holes with respect to the rotation center, a machining order creating unit configured to create a machining order of machining a first hole to be machined with the first spindle and a second hole to be machined with the second spindle based on the hole coordinates, a program creating unit configured to create a machining program for machining the first hole with the first spindle and the second hole with the second spindle in the machining order, and a numerical control unit configured to numerically control the machining table, the first spindle, and the second spindle so that the first hole and the second hole are arranged in X direction with the first hole located nearer to the first spindle by rotating the machining table, machining the first hole with the first spindle and machining the second hole with the second spindle according to the machining program.

Preferably, each of the first spindle and the second spindle extends in Z direction. The machining table rotates about a rotation axis parallel to the first spindle and the second spindle. The rotation axis of the machining table is referred to as a center of rotation.

The coordinate system of the machine is an orthogonal coordinate system and shall be as follows.

With the rotation axis of the machining table as the coordinate origin, the X axis (positive rightward direction when viewed from the front) is taken in the left-right direction, the Y axis (positive forward direction) is taken in the front-rear direction of the machining table, the Z axis (positive upward direction) is taken in the vertical direction, and the C axis (positive clockwise direction when viewed from above) is taken in the rotation direction around the rotation axis of the machining table. The X, Y, and Z coordinates of the first spindle are referred to as $x1$, $y1$, and $z1$, respectively. The X, Y, and Z coordinates of the second spindle are referred to as $x2$, $y2$, and $z2$, respectively. Whenever a set of holes is drilled simultaneously, $y1=y2$, sometimes simply denoted y.

With respect to the hole coordinates, when the workpiece 38 is placed so that the center of rotation is at the origin, the X, Y coordinates of each hole on the workpiece 38 are set as the U, V coordinates, respectively. In particular, the X, Y coordinates of the first hole are denoted by $u1$, $v1$, respectively, and the X, Y coordinates of the second hole are denoted by $u2$, $v2$, respectively.

The unit of coordinates is mm for the linear axis, and rad for the rotational axis.

The axis name and unit may be freely changed.

The drilling machine has a floor frame, a column, a cross rail, a first X driving device, a second X driving device, a Y driving device and a table driving device (C driving device). The cross rail is fixed to the column. The X linear guide is arranged on the cross rail. A first Z unit and a second Z unit are arranged on the X linear guide. A Y linear guide (Y guide) is arranged on the floor frame. The first X driving device extends in the X direction and is arranged on the cross rail, and moves the first Z unit in the X direction. The second X driving device extends in the X direction and is arranged on the cross rail, and moves the second Z unit in the X direction. The Y driving device extends in the Y direction and is disposed on the floor frame, and moves the saddle (Y saddle frontward and rearward. The C driving device is arranged on the Y saddle and rotates the machining table about the Z direction. The numerical control unit numerically controls the first X driving device, the second X driving device, the Y driving device, and the table driving device (C driving device) to move the first Z unit, the second Z unit, the Y saddle, and the machining table.

The rotation direction of the machining table may be fixed, and the rotation table that rotates about the Z direction may be placed on the column. At this time, the X linear guide is placed on the rotation table. The table driving device C rotates the rotation table.

The first Z unit includes a first body, a first Z guide, a first Z saddle, a first Z driving device, and a first spindle unit. The Z guide and the Z driving device are arranged in the body extending in the Z direction. The Z saddle is movably arranged on the Z guide in the Z direction. The Z saddle is movably arranged up and down on the Z guide and fixes the spindle unit. The second Z unit is substantially the same as the first Z unit.

Instead of the Z guide, a ball spline or a combination of a slide guide and a slide shaft may be used.

Preferably, the first X driving device, the second X driving device, the Y driving device, the first Z driving device, and the second Z driving device each has a servo motor and a ball screw. Instead of the servo motor and the ball screw, a linear motor may be used.

The Z driving device may be an air cylinder.

Preferably, the first spindle and the second spindle are moved relative to the machining table simultaneously with the rotation of the machining table. More preferably, the movement of the first spindle and the second spindle in the Z direction in the range in which the first hole and the second hole are not machined is performed simultaneously with the rotation of the machining table and the movement of the first spindle and the second spindle in the X direction, Preferably, after each axial movement in the left and right, front and rear, and rotational directions in the non-machined portion is completed, the first spindle and the second spindle are simultaneously lowered to machine the workpiece.

Preferably, the program creating unit creates the machining program. The machining program is stored in the storage device. The user may create the machining program.

The machining order is preferably optimized by an arithmetic device. The machining order is preferably determined by using a genetic algorithm.

The hole coordinates are stored with the hole number. The hole coordinates and hole numbers may be stored in a hole coordinate table. The hole numbers (proximity hole numbers) of the respective adjacent holes (proximity holes) may be stored together as the target holes to be machined.

The hole coordinates may be stored, for example, as coordinates from the work coordinate origin. In this case, the coordinates of the workpiece coordinate origin from the rotation center are separately stored.

The hole coordinates may be converted into machine coordinates by a coordinate conversion unit.

The coordinates of the first hole to be drilled with the first spindle and the coordinates of the second hole to be drilled with the second spindle simultaneously with the first hole are converted to obtain the machine coordinates. First, the rotation angle (c, t) formed by the straight line connecting the first hole and the second hole with the U axis is obtained. Next, the hole coordinates of the first hole and the second hole are rotated by the rotation angle (c, t) about the origin to obtain the first conversion coordinates. Next, the first conversion coordinate is adjusted so that one of the first hole and the second hole is always larger than the other in the U coordinate. For example, the u1 coordinate is made smaller than the u2 coordinate. When the U coordinate (u1, t) of the first hole of the first conversion coordinate is less than the U coordinate (u2, t) of the second hole of the first conversion coordinate, the first conversion coordinate is taken as the machine coordinate. Otherwise, the first conversion coordinate is rotated by $\pi$ about the origin to obtain the second conversion coordinate. The second conversion coordinates are defined as machine coordinates. Here, the U coordinate is defined as the X coordinate, and the V coordinate is defined as the Y coordinate. The sum total of the rotation angles is defined as the C coordinate. The C coordinate may be adjusted to be in phase, e.g., 0-2$\pi$.

The program creating unit creates the machining program based on the machine coordinates obtained by converting the hole coordinates of the first hole and the second hole.

The user may input the machining program or the hole coordinates from the input unit or the input/output port. The hole coordinates may be collectively input in the form of a table. The hole coordinates are stored in the coordinate storage unit.

Preferably, the fitness function indicates a value corresponding to the integrated amount of the positioning time in the XY plane of the first spindle and the second spindle when the individual is machined in the machining order. In other words, the fitness function indicates a value corresponding to the non-machining time. Particularly preferably, the fitness function indicates a value corresponding to the integrated value of the air cut time of each axis.

The spindle moving amount in the X direction, the machining table moving amount in the Y direction, and the rotation amount of the machining table correspond to the moving time of each spindle or axis. When the position of the spindle is made to coincide with the hole position, it is often the case that each spindle is moved at the maximum speed at the same time. Preferably, the evaluation unit calculates the moving distance corresponding to the maximum value of the moving time in the Y direction and the rotation direction of the table with respect to the X direction movement time as the moving amount. The integrated value of the X direction movement time and the maximum value of the moving amount of each shaft is defined as a fitness.

Preferably, when the moving amount of the C coordinate exceeds 2$\pi$, the coordinate conversion unit increases or decreases the C coordinate by 2$\pi$ to be 2$\pi$ or less.

The first coefficient may be a comparison value of the servo parameter in the table moving direction with respect to the servo parameter of the first spindle or the second spindle in X direction. For example, the magnification of the value of the acceleration/deceleration in the table moving direction with respect to the value of the acceleration/deceleration of the first spindle in X direction may be used.

The second coefficient may be a comparison value of the servo parameter of the table rotation axis with respect to the servo parameter of the first spindle or the second spindle in X direction. For example, a magnification of the acceleration/deceleration value of the table rotation axis with respect to the acceleration/deceleration value of the first spindle in X direction may be used.

The fitness function may he changed according to the moving speed of each shaft or axis. For example, when the moving time of the linear axis is very short, the value of the fitness function may be an integrated value of the moving amount in the table rotation direction.

Typical selection methods such as elite selection, roulette selection, ranking selection, tournament selection, GENITOR algorithms, etc. may be used in the reproduction. A combination of these selection methods may also be used. The elite selection is, for example, a two-generation elite selection.

Upon reproduction, individuals with small fitness multiply and individuals with large fitness die.

Restricted selection is preferably available. The restriction unit removes individuals that include a set of holes less than a minimum distance. Here, the minimum distance is determined as a minimum distance at which the first spindle and the second. spindle do not interfere with each other. Restricted selection may be combined with any selection method.

Preferably, the restriction unit removes an individual including a combination in which the difference between the X coordinates of the coordinate converted machine coordinates is less than the minimum distance for each combination of the first hole and the second hole.

Among the populations, individuals to which a crossover is performed at a certain rate are selected and a crossover is performed. A portion of the population that has been changed in part by crossover may be mutated.

The crossover is preferably a one-point crossover or a two-point crossover. A set of parents is selected at random. The crossover points are selected at random as one point or two points. In the case of a two-point crossover, the order of the holes between the two crossover points is exchanged between a set of parents. The crossover point is a boundary between a set of the first hole and the second hole and the next set of the first hole and the second hole in the path representation.

The genetic operators unit may include a mutation unit that mutates an individual to generate a new individual.

The genetic operators unit selects individuals from a population that are to be randomly mutated at a constant rate. The following three mutations can be used, for example. These may be used in combination. Mutations may be combined with any crossover method.
(1) Two randomly selected machining holes are replaced.
(2) The combinations of two randomly selected sets of holes are exchanged.
(3) A set of holes in an individual is removed, packed behind, and inserted at the location of the randomly selected set of holes.

Reproduction, crossover, and mutation evolve into the next generation of populations.

The end condition of the genetic algorithm is, for example, a preset number of times of generation change (end count). When the number of generation change reaches the end number, the determination unit selects the individual with the smallest fitness as the machining order.

The number of target holes may be an odd number. At this time, a hole (single hole) which is riot set is selected. The single hole is machined on either the first spindle or the second spindle. Preferably, the single hole is machined at the last.

Preferably, the individual is expressed by arranging a set of hole numbers of the first hole and the second hole, and a hole number of the single hole in the machining order.

Machine coordinates (x, y) when machining the single hole are represented based on the hole coordinates (u, v) of the single hole, with the X and Y coordinates as a function of the C coordinates, respectively. The C coordinate of the single hole is determined so that the moving time from the machine coordinate of the set of the immediately preceding machining order of the single hole to the hole coordinate of the single hole is minimized. Preferably, the selected spindle for machining the single hole is determined so that the machining time is minimized. For example, the machining time in the case of machining with the first spindle and the machining time in the case of machining with the second spindle are calculated, respectively, and the machine coordinates of the single hole and the spindle to be used are determined so that the machining time is minimized.

The X coordinate of the other spindle (unselected spindle) is determined so that the distance between the selected spindle and the unselected spindle is equal to or greater than the minimum distance and the moving amount of the unselected spindle from the X coordinate in the immediately preceding machining is minimized when the selected spindle machines the single hole.

The odd-numbered individual representations may be combined with any of the evaluation, reproduction, crossover, or mutation processes described above.

The program creating unit creates a machining program in accordance with the created machining order. The program creating unit creates a numerical control program based on each axis coordinate converted by the evaluation unit. When the hole coordinate includes the Z coordinate, the program creating unit reads the Z coordinate from the hole coordinate storage unit and creates the machining program. The Z coordinate may be stored separately from the hole coordinate.

BRIEF DESCRIPTION OF DRAWINGS

FIG. 7 shows a chromosome representation (individual) representing the machining order according to the first embodiment.

FIG. 9 shows a crossover method according to the first embodiment.

FIG. 13 shows a chromosome representation (individual) representing the machining order according to a second embodiment.

DETAILED DESCRIPTION

First Embodiment

Figure 1:
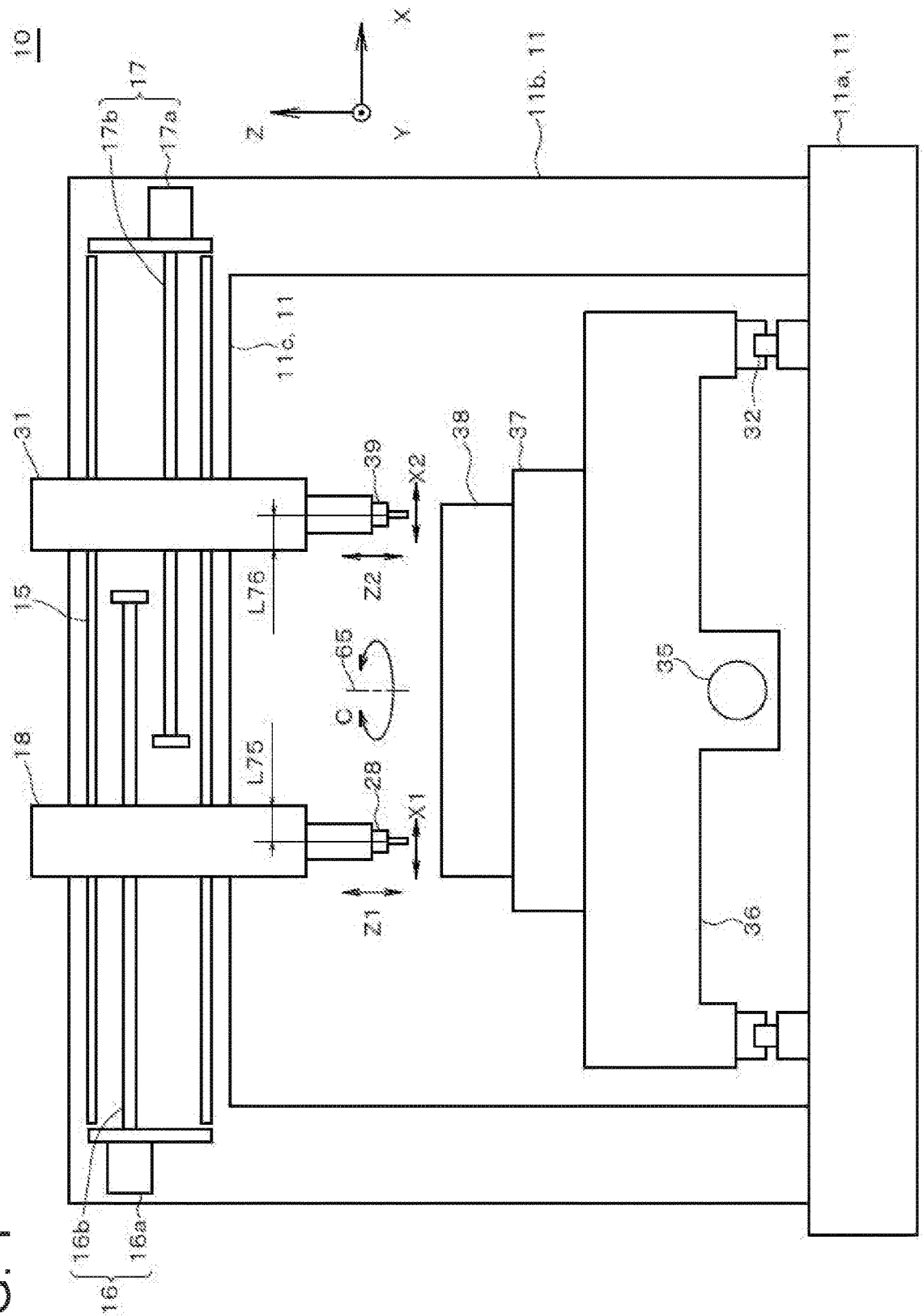
FIG. 1 shows a drilling machine according to a first embodiment.

The first embodiment deals with the case where the number of target holes is an even number. As shown in FIG. 1, a drilling machine 10 includes a frame 11, a Y guide (Y linear guide 32, a Y driving device 35, a Y saddle 36, a machining table 37, an X guide (X linear guide) 15, a first X driving device 16, a second X driving device 17, a first Z unit 18, a second Z unit 31, a first spindle 28, and a second spindle 39.

The frame 11 includes a floor frame 11a, a pair of columns 11b, and cross rails 11c. Each column 11b is fixed to the floor frame 11a. The cross rail 11c extends in the X direction and is fixed between the pair of columns 11b.

The pair of Y guides 32 extends in the Y direction and is fixed to the floor frame 11a. The Y saddle 36 is disposed on the Y guide 32 in a movable manner in the Y direction. The Y driving device 35 includes a Y ball screw (not shown) and a Y motor (not shown).

The machining table 37 is disposed on the Y saddle 36 in a rotatable manner about a rotation center 65. The machining table 37 is connected to a table rotating device (C motor, not shown) and is rotated by the C motor. The machining table 37 fixes a workpiece 38.

A pair of X guides 15 extends in the X direction and is arranged on the cross rail 11c. The first Z unit 18 and the second Z unit 31 are disposed on the cross rail 11c in a movable manner in the X direction. The first Z unit 18 is disposed on the left side of the second Z unit 31 as viewed from front.

The first X driving device 16 includes a first X motor 16a and a first X ball screw 16b. The first X driving device 16 extends in the X direction and is disposed on the cross rail 11c, and drives the first Z unit 18. Preferably, the first X driving device 16 is arranged on the left side of the cross rail 11c as viewed from front and extends between 50% and 70% of the X-guide.

The second X driving device 17 is disposed on the right side of the cross rail 11c as viewed from front, and drives the second Z unit 31. Other parts of the second X driving device 17 is substantially the same as the first X driving device 16.

Figure 2:
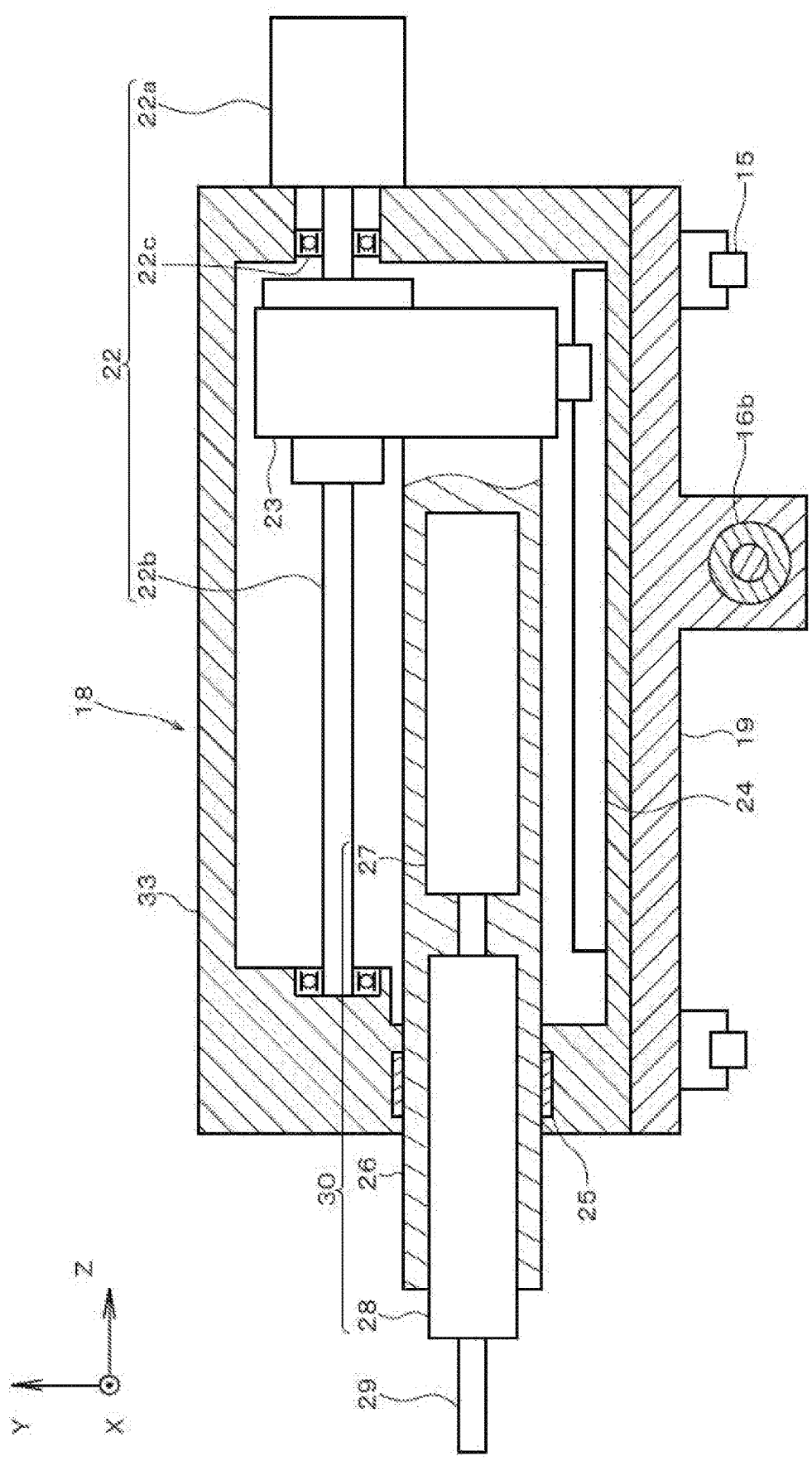
FIG. 2 is a longitudinal cross-sectional view of a Z unit according to the first embodiment.

As shown in FIG. 2, the first Z unit 18 includes an X saddle 19, a body 33, a Z guide 24, a Z saddle 23, a Z driving device 22, a spindle unit 30, and a bush 25. The Z driving device 22 includes a Z motor 22a, a Z ball screw 22b, and bearings 22c. The Z ball screw 22b is supported by the bearing 22c and directly connected to the Z motor 22a, and its nut is fixed to the Z saddle 23. The spindle unit 30 is slidably guided by the bush 25. The spindle unit 30 includes a ram 26, a spindle 28, and a spindle motor 27. The spindle 28 is rotatably supported in the ram 26 and is directly connected to the rotor of the spindle motor 27. The spindle 28 fixes a tool 29, for example a drill, a reamer or a tap. The first Z unit 18 may be a machining tool disclosed in Japanese Patent No. 3792456 or Japanese Utility Model Registration No. 3130456.

The second Z unit 31 includes a second Z driving device (not shown). The second Z driving device drives the second spindle 39 in the Z direction.

Figure 3:
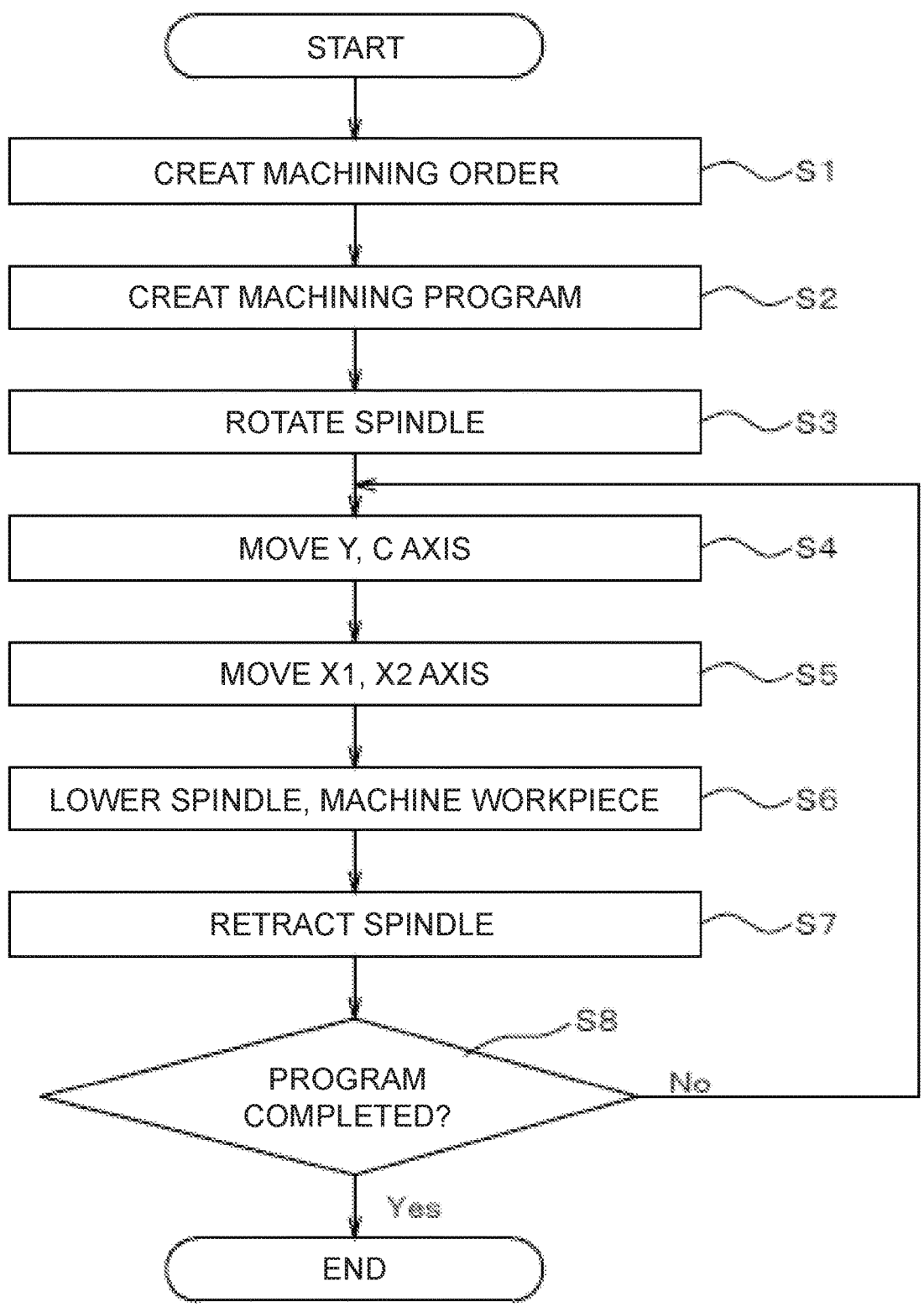
FIG. 3 is a flowchart of a drilling method according to the first embodiment.

The machining method will be described with reference to FIG. 3. First, a plurality of target holes are divided into multiple sets of two holes. In step S1, the multiple sets of two holes are arranged in order to create a machining order. Next, in step S2, a machining program is created in accordance with the machining order. In step S3, the first spindle 28 and the second spindle 39 are rotated by the spindle motor. In step S4, the Y driving device 35 moves the Y direction of the machining table 37. The C motor moves the rotation direction (C axis) of the machining table 37. In step S5, The first X driving device 16 moves the X direction (X1 axis) of the first Z unit 18. The second X driving device 17 moves the X direction. (X2 axis) of the second Z unit 31. In step S6, the first spindle 28 and the second spindle 39 are lowered, and the workpiece 38 is drilled. In step S7, the first spindle 28 and the second spindle 39 are raised, and the first spindle 28 and the second spindle 39 are retracted. Steps S4 to S7 are repeated until the machining program is completed (step S8).

Figure 4:
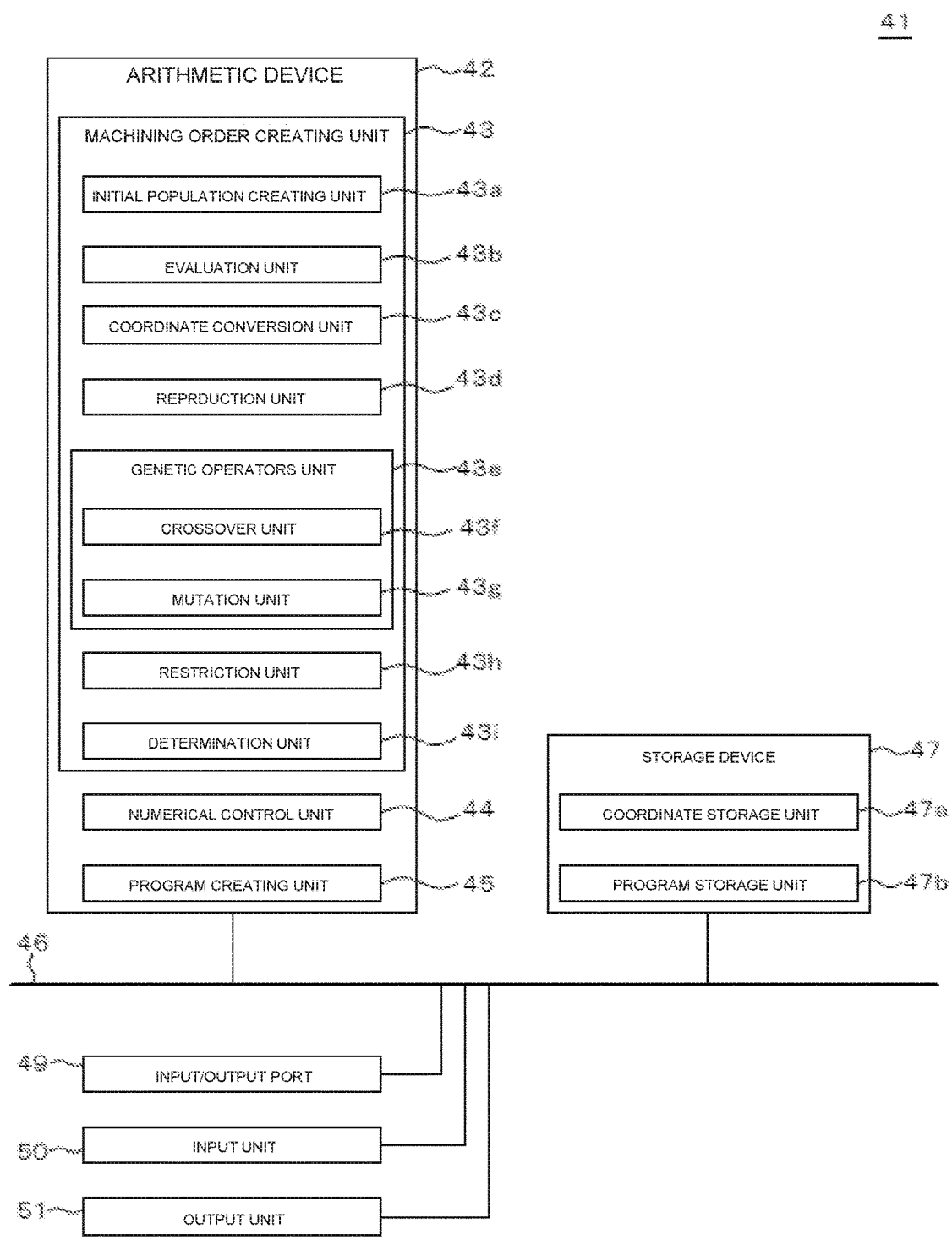
FIG. 4 shows a control device of the drilling machine according to the first embodiment.

As shown in FIG. 4, a control device 41 includes an arithmetic device 42, a storage device 47, an input/output port 49, an input unit 50, an output unit 51, and a bus 46. The bus 46 connects and communicates the arithmetic device 42, the storage device 47, the input/output port 49, the input unit 50, and the output unit 51.

The arithmetic device 42 includes a numerical control unit 44. The numerical control unit 44 controls the first X driving device 16, the second X driving device 17, the Y driving device 35, the first Z driving device 22, the second Z driving device, the table rotating device, the first spindle 28, and the second spindle 39. Preferably, the arithmetic device 42 includes a machining order creating unit 43 and a program creating unit 45. The machining order creating unit 43 includes an initial population creating unit 43a, an evaluation unit 43b, a coordinate conversion unit 43c, a reproduction unit 43d, a genetic operators unit 43e, and a determination unit 43i. Preferably, the machining order creating unit 43 includes a restriction unit 43h. The genetic operators unit 43e includes a crossover unit 43f and a mutation unit 43g. The program creating unit 45 creates a machining program based on the determined machining order and the hole coordinates converted into the machine coordinates.

The storage device 47 includes a main storage device and an external storage device. The storage device 47 may include a coordinate storage unit 47a and a program storage unit 47b. The coordinate storage unit 47a and the program storage unit 47b store the hole coordinates and the machining program, respectively.

The input unit 50 is, for example, a keyboard or a pointing device. The output unit 51 is, for example, a monitor. The input/output port 49 is, for example, a communication port such as a USB port or a wireless communication port. The input/output port communicates with the first X driving device 16, the second X driving device 17, the Y driving device 35, the first Z driving device 22, the second Z driving device, the table rotation device, the first spindle 28, and the second spindle 39.

Figure 5:
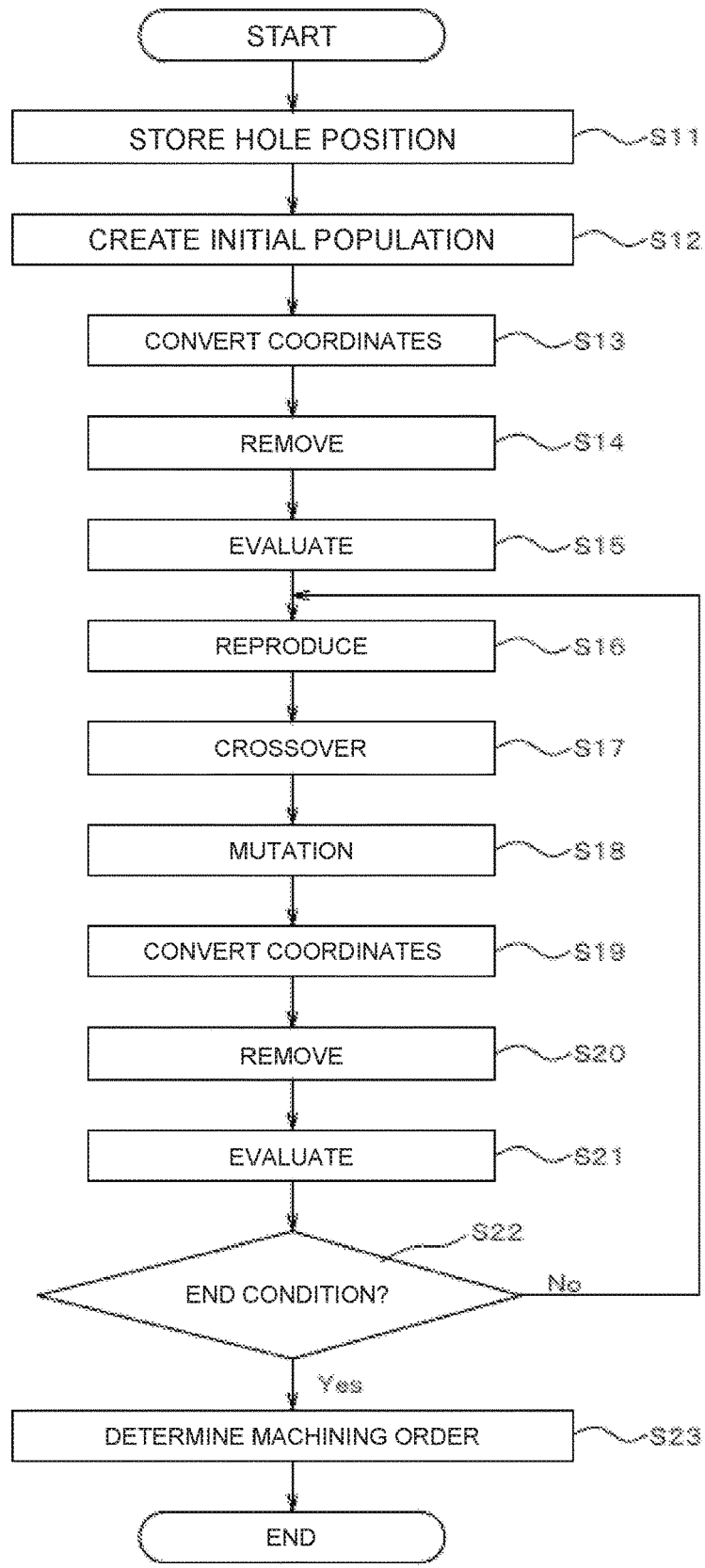
FIG. 5 is a flowchart of determining the machining order according to the first embodiment.

The method of determining the machining order by the genetic algorithm will be described with reference to FIG. 5. First, in step S11, the storage device 47 stores the hole position. In step S12, the initial population creating unit 43a creates an initial population with individuals. In steps S13 and S19, the coordinate conversion unit 43c converts the hole coordinates of the first hole and the second hole, and calculates the machine coordinates. In steps S14 and S20, the restriction unit 43h removes individuals that cannot be machined from among the generated individuals. In steps S15 and S21, the evaluation unit 43b evaluates the fitness of each individual. In step S16, the reproduction unit 43d reproduces an individual having a small fitness. The crossover unit 43f crosses the two parents to generate a child in step S17. In step S18, the individual is mutated by the mutation unit 432. The determination unit 43i determines whether or not the end condition has been met, and repeats steps S16 to S21 until the end condition has been met (S22). When the end condition is met, the determination unit 43i determines the machining order in step S23.

Figure 6:
FIG. 6 is a coordinate table according to the first embodiment.

In step S11, the hole coordinates are input to the hole coordinate table 54. As shown in FIG. 6, the hole coordinate table 54 includes a hole number 54a, u and v coordinates 54b. The hole coordinate table 54 may include z1 and z2 coordinates 54c. The z1 coordinate represents the Z coordinate of the upper end of the hole, and the z2 coordinate represents the Z coordinate of the lower end of the hole.

In step S12, the initial population creating unit 43a randomly arranges the hole numbers and generates the initial population by a predetermined number (the number of the individuals of the initial population).

As shown in FIG. 7, each individual is coded as a pass representation of sets of hole numbers for the first hole and the second hole arranged in the machining order. That is, each individual is represented by arranging the hole numbers in the order of the first hole of the first set, the second hole of the first set, the first hole of the second set, the second hole of the second set, ..., the first hole of the n-th set, the second hole of the n-th set, and so on in the machining order.

Figure 8A:
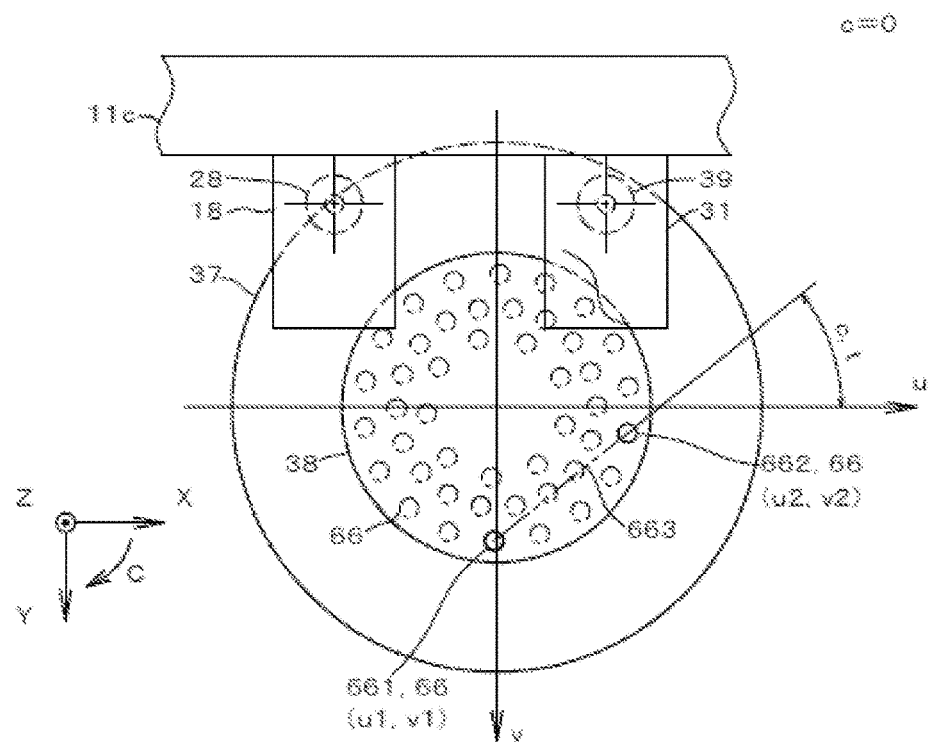
FIG. 8A shows a coordinate conversion method according to the first embodiment.
Figure 8B:
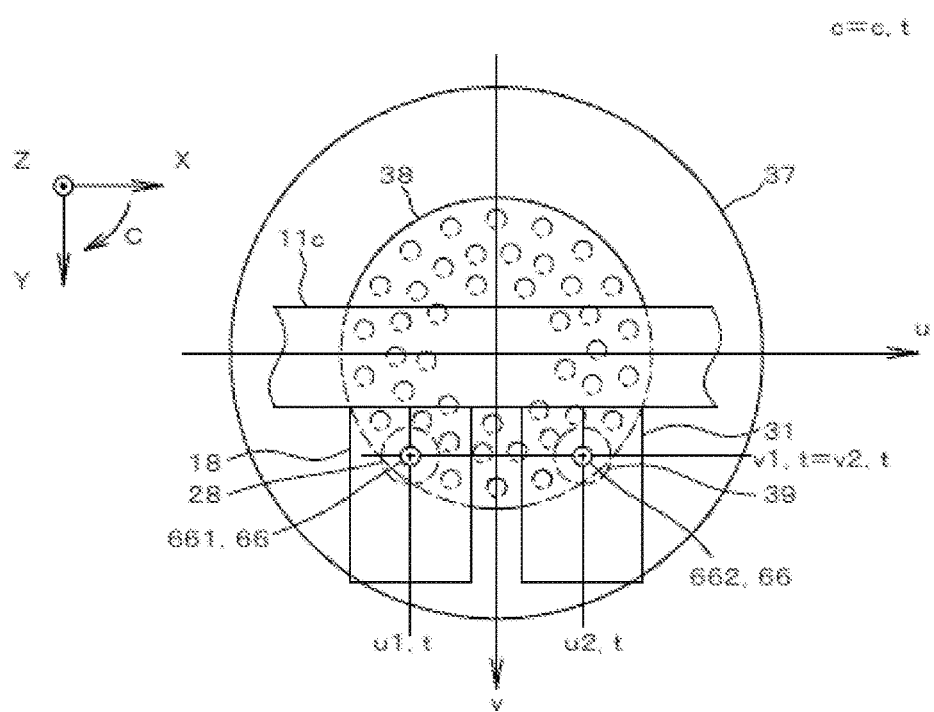
FIG. 8B shows a coordinate conversion method according to the first embodiment.

The coordinate conversion in steps S13 and S19 will be described below. The FIG. 8A shows the workpiece 38 as viewed from above when the C axis is at the origin. The workpiece 38 has a plurality of target holes 66 to be machined. The target holes 66 includes a first hole 661 and a second hole 662 defined in the machining order. The angle formed by the U axis and the straight line 663 connecting the first hole 661 and the second hole 662 is defined as a rotation angle (c, t). The FIG. 8B shows the workpiece 38 as viewed from above when the machining table 37 is rotated by the rotation angle (c, t). As shown in FIG. 8B, when the first hole 661 and the second hole 662 are machined, the straight line 663 is parallel to the X axis, and the first hole 661 is located on the left side of the second hole 662.

The machine coordinates for machining the set of the first and second holes are calculated by the following equation:

$$c, t = -\tan^{-1}\left(\frac{v2-v1}{u2-u1}\right)$$ [Equation 1]

$$\begin{pmatrix} u1, t \\ v1, t \end{pmatrix} = \begin{pmatrix} \cos(c, t) & -\sin(c, t) \\ \sin(c, t) & \cos(c, t) \end{pmatrix}\begin{pmatrix} u1 \\ v1 \end{pmatrix}$$

$$\begin{pmatrix} u2, t \\ v2, t \end{pmatrix} = \begin{pmatrix} \cos(c, t) & -\sin(c, t) \\ \sin(c, t) & \cos(c, t) \end{pmatrix}\begin{pmatrix} u2 \\ v2 \end{pmatrix}$$

if $u1, t < u2, t;$ $x1 = u1, t$ $x2 = u2, t$ $y = y1, t = y2, t$ $c = c, t$ else;

$x1 = -u1, t$ $x2 = -u2, t$ $y = -y1, t = -y2, t$ $c = c, t + \pi$

Here, (u1, v1) represents hole coordinates of the first hole.

(u2, v2) represents hole coordinates of the second hole.

(c, t) represents an angle (rad) between the U axis and the straight line connecting the first hole and the second hole.

(u1,t, v1,t) represents coordinates of the first hole after rotational coordinate conversion by the rotation angle (c, t) around the origin.

(u2,t, v2,t) represents coordinates of the second hole after rotational coordinate conversion by the rotation angle (c, t) around the origin.

x1 represents X coordinate (machine coordinate) of the first spindle.

y1 represents Y coordinate (machine coordinate) of the first spindle.

x2 represents X coordinate (machine coordinate) of the second spindle.

y2 represents Y coordinate (machine coordinate) of the second spindle.

c represents C coordinate (machine coordinate).

The C coordinate is the sum of the rotation angles.

In steps S14 and S20, the restriction unit 43h removes an individual included in a set satisfying the following equation from all sets included in each individual.

$$x2-x1 < L74$$ (Equation 2)

Here, $L74 = L75 + L76 + L77$

L74 represents a minimum distance.

L75 represents a distance from the center axis of the first spindle 28 to the right end of the first Z unit 18 (see FIG. 1).

L76 represents a distance from the center axis of the second spindle 39 to the left end of the second Z unit 31 (see FIG. 1).

L77 represents a collision safe distance.

The restriction unit 43h may remove an individual included in a set satisfying the following expression.

$$\sqrt{(u2-u1)^2+(v2-v1)^2} < L74$$ [Equation 3]

In steps S14 and S20, when the number of populations (population size) is lower than the predetermined number of individuals as a result of the individual being removed by the restriction unit 43h, the initial population creating unit 43a may create a new individual.

In steps S15 and S21, the evaluation unit 43b calculates the fitness as a value of a fitness function f(s).

Here, $x1_n$ represents X coordinate (X1 coordinate, machine coordinate) of the first spindle of the n-th set of the first hole and the second hole.

$x2_n$ represents X coordinate (X2 coordinate, machine coordinate) of the second spindle of the n-th set of the first hole and the second hole.

$y_n$ represents the Y coordinate of the n-th set of the first hole and the second hole (mechanical coordinate).

$c_n$ represents C coordinate of the n-th set of the first hole and the second hole.

For example, the fitness function f(s) is expressed by the following equation.

$$f(s) = \sum_n \max$$ [Equation 4]

$(|x1_n - x1_{n-1}|, |x2_n - x2_{n-1}|, E|y_n - y_{n-1}|, F|c_n - c_{n-1}|)$

Here,

E represents a first coefficient.

F represents a second coefficient.

The first coefficient E and the second coefficient F are constants representing the time required by the Y axis and the C axis compared to the X axis, respectively, when attempting to move the same amount as the X axis. For example, E and F satisfy the following equations:

$$E = AX/AY$$

$$F = AX/AC \quad \text{[Equation 5]}$$

Here,

AX represents X axis acceleration.
AY represents Y axis acceleration.
AC represents C axis acceleration.

In step S16, the reproduction unit 43d preferentially reproduces an individual having a small value of the fitness function f(s) among individuals. Selection may be, for example, an elite selection, a roulette selection, a ranking selection, a tournament selection, and GENITOR algorithms. For example, the reproduction unit 43d reproduces only an individual having a small evaluation value among a parent generation and a child generation by the number of the individuals.

In step S17, the crossover unit 43f randomly selects two parents, and crosses them to generate a child. The crossover unit 43f performs crossover by PMX (partially matched crossover), OX (ordered crossover), CX (cycle crossover), or ER (edge recombination) as a unit of the set of the first hole and the second hole.

For example, FIG. 9 shows a two-point crossover by PMX. The crossover unit 43f randomly selects two crossover points.

In step S18, the mutation unit 43g randomly selects an individual among the population, and makes a mutation. Three mutation techniques are exemplified below.

Figure 10:
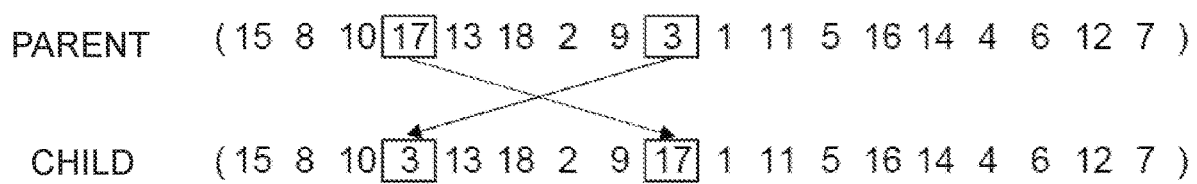
FIG. 10 shows a mutation by exchanging two holes according to the first embodiment.

As shown in FIG. 10, two holes are randomly selected and exchanged.

Figure 11:
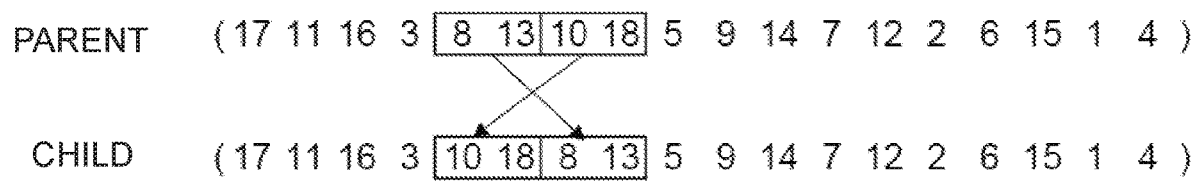
FIG. 11 shows a mutation by exchanging the two sets of combination according to the first embodiment.

As shown in FIG. 11, two sets of the first hole and the second hole are randomly selected and exchanged. At this time, the set of the first hole and the second hole is not changed.

Figure 12:
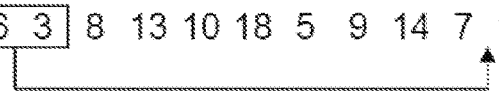
FIG. 12 shows a mutation by insertion of a set of combination according to the first embodiment.

As shown in FIG. 12, a set of randomly selected first and second holes is extracted and packed behind. The extracted set is inserted at the positions of the randomly selected set, followed by sequential shifting.

In step S22, the end condition may be that the number of generation alternations reaches a predetermined number of final generation alternations. When the number of repeating the cycles of steps S16 to S21 reaches the final generation alternation number, the determination unit 43i determines that the end condition is met.

The determination unit 43i sets the population at that time as the final generation. The determination unit 43i selects an individual having the smallest fitness among the final generation. In step S23, the determination unit 43i determines the order of the sets of the hole number of the first hole and the hole number of the second hole represented by the selected individual as the machining order.

According to the drilling method of the present embodiment, since two holes can be simultaneously machined, the machining time can be greatly shortened. The drilling machine 10 rotates the machining table 37 to position any two holes parallel to the X axis. Therefore, it is possible to simultaneously machine two holes for a plurality of holes which are not regularly arranged along the X axis. The drilling machine 10 is a vertical type. The Z units 18 and 31, which move the spindles 28 and 39 in Z direction, are fixed to the cross rail 11c in a movable manner in X direction. The table rotation shaft, and the table front and rear shafts are disposed on the floor frame 11a. Therefore, it is only necessary to manufacture the Z unit which focuses only on the thrust direction. Therefore, the entire drilling machine 10 can be manufactured at lower cost.

The drilling method of the present embodiment uses a genetic algorithm to determine the set of the first hole and the second hole, and the machining order. Therefore, the machining program can be easily created for the workpiece 38 including a large number of holes to be drilled. The restriction unit 43h removes an individual of a set of holes in which the two Z units 18 and 31 interfere with each other. For this reason, it is possible to select a machining order composed of appropriate sets from sets of the first hole and the second hole in which the two Z units do not interfere with each other.

In the present embodiment, the number of the target holes is an even number, but the present embodiment can be applied also to the case where the number of the target holes is an odd number, except for a difference from a second embodiment described later.

Second Embodiment

The second embodiment deals with the case where the number of target holes is an odd number. The present embodiment differs from the first embodiment in the individual representation and the coordinate determination method of the single hole by the coordinate conversion unit 43c. A single hole is machined after machining each set of two target holes. The other points are substantially the same as the first embodiment.

Preferably, as shown in FIG. 13, the individual is path-represented by arranging the sets of the first hole and the second hole, and the hole number of the single hole in the order of machining. That is, each individual is represented by arranging the hole numbers in the order of the first hole of the first set, the second hole of the first set, the first hole of the second set, the second hole of the second set, . . . , the single hole. Immediately before the single hole is treated as the boundary of the set.

The machine coordinates of the single hole are determined as follows. First, the X and Y coordinates are expressed as a function of the C coordinates.

$$\begin{pmatrix} x_a \\ y_a \end{pmatrix} = \begin{pmatrix} \cos(c_a) & -\sin(c_a) \\ \sin(c_a) & \cos(c_a) \end{pmatrix} \begin{pmatrix} u_a \\ v_a \end{pmatrix} \quad \text{[Equation 6]}$$

Here, $(u_a, v_a)$ represents a hole coordinate of single hole.

$x_a$ represents X coordinate (machine coordinate) of single hole.

$y_a$ represents Y coordinate (machine coordinate) of single hole.

$c_a$ represents C coordinate (machine coordinate) of single hole.

Next, the C coordinate is determined so that the function g(c) representing the moving distance from the immediately preceding machine coordinate to the single hole machine coordinate becomes the minimum value. The function g(c) is expressed the following equation.

$$g(c) = \max(|x_a - x1_{a-1}|, |x_a - x2_{a-1}|, E|y_a - y_{a-1}|, F|c_a - c_{a-1}|) \quad \text{[Equation 7]}$$

Here, $x1_{a-1}$ represents X coordinate (X1 coordinate, machine coordinate) of the first spindle for the set of the first hole and the second hole immediately before the single hole.

$x2_{a-1}$ represents X coordinate (X2 coordinate, machine coordinate) of the second spindle for the set of the first hole and the second hole immediately before the single hole.

$y_{a-1}$ represents Y coordinate (machine coordinate) for the set of the first hole and the second hole immediately before the single hole.

$c_{a-1}$ represents C coordinate (machine coordinate) for the set of the first hole and the second hole immediately before the single hole.

The determined C coordinate is then substituted into Equation 6 to determine the machine coordinate $(x_a, y_a, c_a)$ of the single hole.

Finally, the distances from the X coordinate $(x_a)$ of the single hole to the X1 coordinate $(x1_{a-1})$ of the immediately preceding machined hole and the X2 coordinate $(x2_{a-1})$ of the immediately preceding machined hole are calculated, respectively. It is defined that a single hole is machined on the spindle (selected spindle) with the closer distance. That is, when the set immediately before the single hole is machined, the spindle closer to the X coordinate of the single hole is selected as the selected spindle. When the first spindle is close to the single hole, the single hole is set as the first hole, and the X coordinate of the single hole is set as the X1. coordinate. On the other hand, when the second spindle is close to the single hole, the single hole is set as the second hole, and the X coordinate of the single hole is set as the X2 coordinate.

When a single hole is described at the end of the machining order in the individual representation, regardless of whether the number of target holes is an odd number or an even number, the sets can be defined at every two position from the beginning of the individual representation. Therefore, the calculation is easy. By machining the single holes at the end of the machining order, the target holes are machined as they appear in the individual representation.

The single hole may be processed at the beginning. In this case, the coordinate determination is determined by the machine coordinates of the set of the first hole and the second hole to be processed immediately after and the hole coordinates of the single hole.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

For example, in the individual representation, after the hole numbers of the first holes are arranged in the machining order, the hole numbers of the second holes may be arranged in the machining order. In this case, the crossover point of the second hole and the crossover point of the first hole are made to coincide with each other so that the set of the first hole and the second hole in the parent machining order is not broken at the crossover.

REFERENCE SIGNS LIST

10 Drilling machine
11*b* Column,
11*c* cross rail
15 X linear guide
18 Z unit (first spindle unit)
28 First spindle
31 Z unit (second spindle unit)
32 Y guide
36 Y saddle
37 Machining table
39 Second spindle
41 Control device
43 Machining order creating unit
44 Numerical control unit
45 Program creating unit
47 Storage device

What is claimed is:

1. A drilling method, comprising:
creating a machining order of machining a first hole to be machined with a first spindle and a second hole to be machined with a second spindle for a workpiece having a plurality of target holes for reducing a total machining time by using a genetic algorithm, the workpiece arranged on a machining table, the first spindle and the second spindle arranged in X direction;
rotating the machining table relative to the first spindle and the second spindle so that the first hole and the second hole are arranged in X direction with the first hole located nearer to the first spindle;
moving the first spindle and the second spindle relative to the machining table so that the first hole and a center of the first spindle are aligned and the second hole and a center of the second spindle are aligned; and
machining the first hole with the first spindle and the second hole with the second spindle.

2. The drilling method according to claim 1, further comprising:
moving the first spindle and the second spindle along X direction while rotating the machining table relative to the first spindle and the second spindle.

3. The drilling method according to claim 2, further comprising:
storing hole coordinates of the target holes with respect to a rotational center of the machining table relative to the first spindle and the second spindle.

4. The drilling method according to claim 2, further comprising:
creating the machining order and sets of the first hole and the second hole for reducing a total machining time.

5. The drilling method according to claim 1, further comprising:
storing hole coordinates of the target holes with respect to a rotational center of the machining table relative to the first spindle and the second spindle.

6. The drilling method according to claim 5, further comprising:
creating the machining order and sets of the first hole and the second hole for reducing a total machining time.

7. The drilling method according to claim 1, further comprising:
creating the machining order and sets of the first hole and the second hole for reducing a total machining time.

8. The drilling method according to claim 1, further comprising:
randomly creating an initial population with a population of individuals representing the machining order and sets of the first hole and the second hole;
performing crossover two individuals selected from the population;
evaluating a fitness as a value of a fitness function for the individual based on the hole coordinates, the fitness function based on a first spindle moving amount, a second spindle moving amount, a table moving amount and a table rotating amount;

reproducing a population of individuals having a small fitness to a new generation with a population of individuals;

repeating the performing crossover, the evaluating the fitness, and the reproducing the population of individuals until an end condition is satisfied; and determining the machining order by the individual having the smallest fitness among a final generation of individuals obtained when the end condition is satisfied.

9. The drilling method according to claim 1, further comprising:

storing the hole coordinates with respect to the hole number; and creating the individual coded as a pass representation of sets of hole numbers for the first hole and the second hole arranged in the machining order.

10. The drilling method according to claim 9, further comprising:

performing crossover by partially matched crossover, ordered crossover, cycle crossover, or edge recombination as a unit of the set of individuals.

11. The drilling method according to claim 1, wherein the value of the fitness function is a maximum value among the first spindle moving amount in X direction, the second spindle moving amount in X direction, the table moving amount in Y direction, and the table rotating amount.

12. The drilling method according to claim 1, further comprising:

removing the individual included in a set satisfying that the distance between the first hole and the second hole is less than the smallest distance in which the first spindle does not interfere with the second spindle.

* * * * *